United States Patent
Stutzman et al.

(10) Patent No.: US 9,463,433 B2
(45) Date of Patent: Oct. 11, 2016

(54) NANO-MATERIALS FOR ADHESIVE-FREE ADSORBERS FOR BAKABLE EXTREME HIGH VACUUM CRYOPUMP SURFACES

(71) Applicant: JEFFERSON SCIENCE ASSOCIATES, LLC, Newport News, VA (US)

(72) Inventors: Marcy Stutzman, Newport News, VA (US); Kevin Jordan, Newport News, VA (US); R. Roy Whitney, Newport News, VA (US)

(73) Assignees: JEFFERSON SCIENCE ASSOCIATES, LLC, Newport News, VA (US); BNNT, LLC, Newport News, VA (US)

( * ) Notice: Subject to any disclaimer, the term of this patent is extended or adjusted under 35 U.S.C. 154(b) by 315 days.

(21) Appl. No.: 14/300,464

(22) Filed: Jun. 10, 2014

(65) Prior Publication Data

US 2014/0373558 A1 Dec. 25, 2014

Related U.S. Application Data

(60) Provisional application No. 61/838,450, filed on Jun. 24, 2013, provisional application No. 61/913,257, filed on Dec. 7, 2013.

(51) Int. Cl.
| | |
|---|---|
| *B01J 20/20* | (2006.01) |
| *B01J 20/02* | (2006.01) |
| *F04B 37/04* | (2006.01) |
| *F04B 37/08* | (2006.01) |

(52) U.S. Cl.
CPC .......... *B01J 20/205* (2013.01); *B01J 20/0259* (2013.01); *F04B 37/08* (2013.01)

(58) Field of Classification Search
CPC .... B01J 20/205; B01J 20/0259; F04B 37/04; F04B 37/08; F04B 37/10
USPC ......................................... 62/55.5; 252/181.1
See application file for complete search history.

(56) References Cited

U.S. PATENT DOCUMENTS

| | | | | |
|---|---|---|---|---|
| 5,305,612 | A * | 4/1994 | Higham | F04B 37/08 62/383 |
| 7,927,525 | B2 * | 4/2011 | Lizotte | B29C 43/003 264/1.34 |
| 8,309,242 | B2 * | 11/2012 | Wei | H01M 4/131 429/218.1 |
| 2005/0155358 | A1 * | 7/2005 | Ash | F04B 37/08 62/55.5 |
| 2005/0237442 | A1 * | 10/2005 | Yamazaki | G02F 1/13624 349/43 |

(Continued)

*Primary Examiner* — Mohammad M Ali

(57) ABSTRACT

A cryosorber panel having nanomaterials used for the cryosorption material, with nanomaterial either grown directly on the cryopanel or freestanding nanomaterials attached to the cryopanel mechanically without the use of adhesives. Such nanomaterial cryosorber materials can be used in place of conventional charcoals that are attached to cryosorber panels with special low outgassing, low temperature capable adhesives. Carbon nanotubes and other nanomaterials could serve the same purpose as conventional charcoal cryosorbers, providing a large surface area for cryosorption without the need for adhesive since the nanomaterials can be grown directly on a metallic substrate or mechanically attached. The nanomaterials would be capable of being fully baked by heating above 100° C., thereby eliminating water vapor from the system, eliminating adhesives from the system, and allowing a full bake of the system to reduce hydrogen outgassing, with the goal of obtaining extreme high vacuum where the pump can produce pressures below $1\times10^{-12}$ Torr.

8 Claims, 1 Drawing Sheet

(56) References Cited

U.S. PATENT DOCUMENTS

Figure 1:
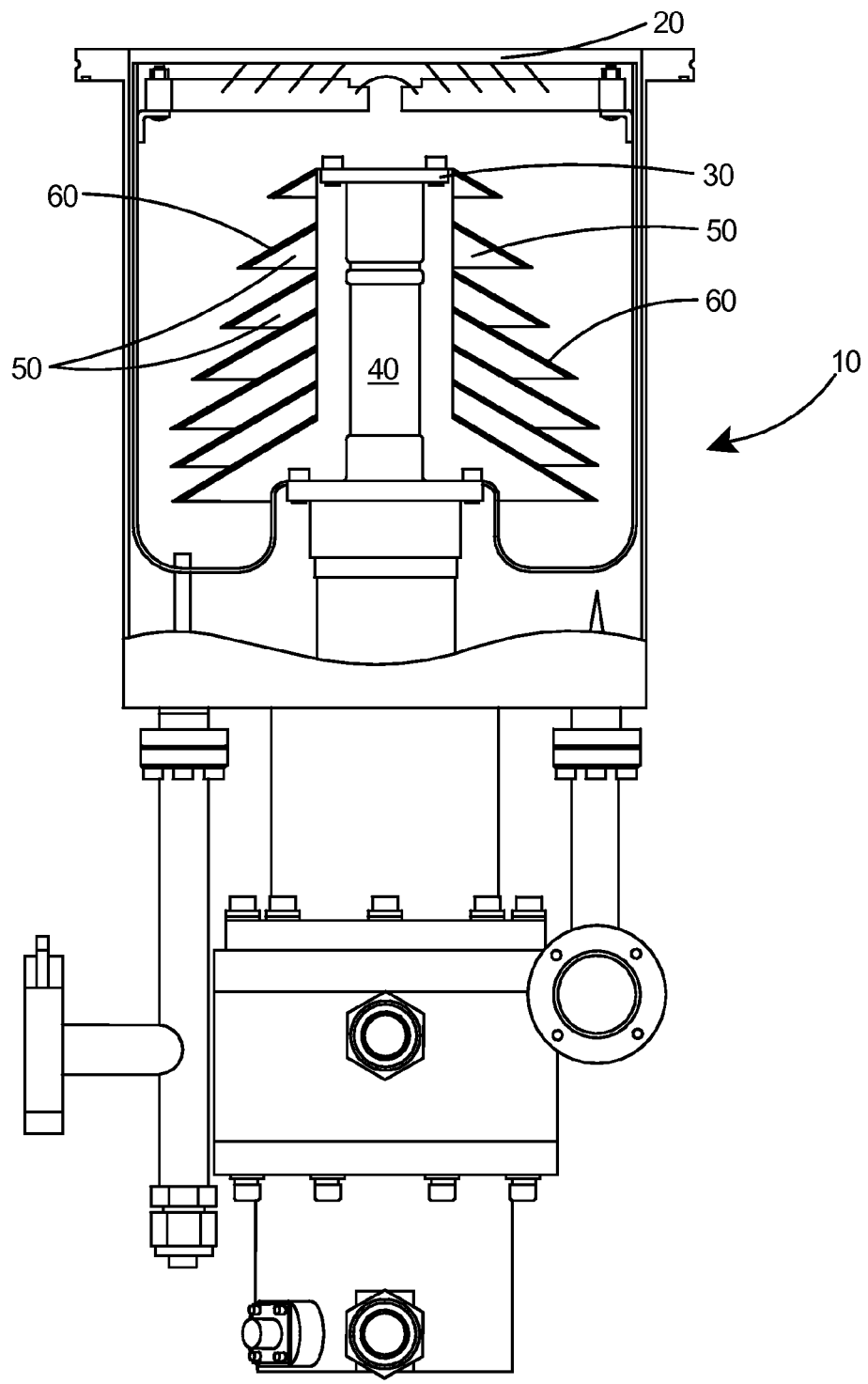

| | | | |
|---|---|---|---|
| 2006/0173397 A1* | 8/2006 | Tu | A61F 9/00781 604/8 |
| 2007/0004225 A1* | 1/2007 | Lu | C30B 11/12 438/778 |
| 2008/0187657 A1* | 8/2008 | Altan | B05D 1/12 427/180 |
| 2008/0191395 A1* | 8/2008 | Johnson | B22F 9/12 266/217 |
| 2010/0192535 A1* | 8/2010 | Smith | B82Y 30/00 57/243 |
| 2011/0104534 A1* | 5/2011 | Wei | H01M 4/131 429/91 |
| 2011/0143915 A1* | 6/2011 | Yin | B01J 23/42 502/5 |
| 2012/0045688 A1* | 2/2012 | Liu | H01G 11/06 429/207 |

* cited by examiner

NANO-MATERIALS FOR ADHESIVE-FREE ADSORBERS FOR BAKABLE EXTREME HIGH VACUUM CRYOPUMP SURFACES

This application claims the priority of U.S. Provisional Application Ser. No. 61/838,450 filed Jun. 24, 2013 and also claims the priority of U.S. Provisional Application Ser. No. 61/913,257 filed Dec. 7, 2013.

The United States government may have certain rights to this invention under The National Aeronautics and Space Administration and/or Management and Operating Contract No. DE-AC05-06OR23177 from the Department of Energy.

FIELD OF THE INVENTION

This invention relates to the use of nano-materials for use in cryopumps, and specifically to the use of a nano-material used as a cryosorber material in a cryopump that eliminates adhesives in the cryopump, enables the cryopump to be fully baked by heating the pump to a temperature above 100° C. to remove water vapor, and can potentially reach pressures below $1\times10^{-12}$ Torr.

BACKGROUND OF THE INVENTION

Cryopumps are the pump of choice when large pump speeds are needed for ultra-high vacuum applications, particularly in areas where magnetic fields would affect the performance of turbo or ion pumps. Cryopumps are ideal for those applications needing large pump speed. Cryopumps are used to pump vacuum systems to pressures typically no lower than $10^{-10}$ Torr, with limitations due to outgassing from the pump materials and water vapor that is not completely eliminated from the cryopump itself. The pump works by removing molecules from the vacuum system by adsorption on the cryosorption material in the cryopump, which is a large surface area material such as charcoal or xeolite which is attached to the cryosorption surface using adhesives.

An extreme high vacuum (XHV) bakable cryopump would be very useful. XHV conditions are becoming prevalent in molecular beam epitaxial machines, electron sources for accelerators and light sources, reactive surface science experiments, nuclear and high energy physics detectors and scattering chambers, and atomic applications such as atomic traps. Existing XHV pumps have limitations such as particulate matter and inability to pump noble gasses (non-evaporable getter pumps) and ion backstreaming (ion pumps). Extreme high vacuum as defined herein is pressure less than $10^{-12}$ Torr or $10^{-10}$ Pa.

Cryopumps typically have two parts: a means for cooling and a cryosorption surface for adsorbing molecules. The cooling can be done in many ways, including closed cycle helium refrigerator systems, liquid helium baths or liquid helium flow. The cryosorption surface is within the vacuum system, in thermal contact to the cooling mechanism, and provides surface area for gas molecules to adsorb and leave the gas phase, reducing the number of gas phase molecules in the system and correspondingly lowering the pressure of the system.

Unfortunately, use of a conventional materials for cryosorption material imparts a serious limitation on the cryopump as it limits the baking temperature of the cryopump. Due to the melting temperature of the adhesive used to adhere the cryosorption material to the cold surface, the cryopump cannot be baked above a temperature typically near 50° C., and thus the base pressure achieved by the cryopump is limited by the water vapor and adhesive vapor pressure. One specialty cryopump avoids the problem of heating the cryosorber adhesive during bake by adding a liquid nitrogen chill circuit to cool the cryosorber panels during the bake of the system, and aims to be able to reach a pressure below $10^{-12}$ Torr. However, this pump is difficult to use and is susceptible to cryogenic failure during the bake, which could cause catastrophic loss of cryosorber material in the pump and furthermore does not eliminate the water contained in the conventional cryosorber material as it limits the bake temperature to below 50° C.

What is needed therefore is a cryosorption material that does not place any limitations on the baking temperature of the cryopump. This would facilitate using cryopumps to reach XHV pressures.

SUMMARY OF THE INVENTION

The invention is the use of nano-materials without adhesives for the cryosorption material in a bakable cryopump for extreme high vacuum use. This could take the form of either a cryosorption panel with nanomaterial grown directly on the panel, or the incorporation of freestanding nanomaterial mechanically attached to the cryosorption panels in a cryopump. The nanomaterials can be grown directly on a metallic substrate using wet chemistry, chemical vapor deposition (CVD), or other appropriate processes. Alternately, freestanding nano-material such as boron nitride nanotube "BNNT Fibril™" could be mechanically attached to the cryosorption surface. A freestanding nanomaterial is able to maintain its form without a support structure or substrate. Such nano-material cryosorption material can be used in place of conventional charcoals that are attached to the cryosorption panels with adhesive. Nano-material cryosorption material could serve the same purpose as conventional adhered charcoal cryosorption material, providing a large surface area for cryosorption without the need for adhesive since the nano-materials can be either grown directly on a metallic substrate or mechanically attached to the cryopanel. The nanomaterials can be tailored with regard to spacing, internal dimensions (nanotubes), multi or single walled structure, and length to optimize the cryosorption capacity of the material. The nano-material cryosorption material would be capable of being fully baked, which reduces hydrogen outgassing from the steel, eliminates water vapor from the system and avoids adhesives with their organic molecule residues. A fully baked cryopump with adhesive-free nano-material cryosorption material is likely able to be used to achieve extreme high vacuum. Nano-material cryosorption materials could be baked within a closed cycle helium refrigerator with the coldhead removed from the system without disturbing the vacuum, or on cryopanels for liquid helium flow or liquid helium bath cryosorption pumps could be baked prior to chilling the pump with liquid helium.

OBJECTS AND ADVANTAGES

A first object of the invention is to eliminate adhesives typically used to attach cryosorption materials to cryopanels by using nano-materials as cryosorption material, thereby allowing a full bake of the cryopump system to reduce hydrogen outgassing and eliminate water vapor from the system, potentially yielding an extreme-high vacuum pump.

A second object of the invention is to provide a cryosorption material in which the nanomaterials are grown directly on the cryosorption panel or use freestanding nanomaterials such as boron nitride nanomaterial (such as the "Fibril BNNT™" product) mechanically attached to the cryosorption panel.

A third object of the invention is to use nano-material rather than conventional cryosorber materials and provide a larger surface area for cryosorption without the need for adhesive.

These and other objects and advantages of the present invention will be better understood by reading the following description along with reference to the drawing.

BRIEF DESCRIPTION OF THE SEVERAL VIEWS OF THE DRAWING(S)

Reference is made herein to the accompanying drawing, which is not necessarily drawn to scale, and wherein:

FIG. 1 is a conceptual view of a cryopump with adhesive-free nanomaterials grown directly on the inner cryopanels or freestanding nanomaterial mechanically attached to the inner cryopanels according to the present invention.

DETAILED DESCRIPTION

Nanomaterials are grown directly on a metallic substrate using wet chemistry, chemical vapor deposition (CVD), or other appropriate processes. The nanomaterials, including carbon nanotubes and other nanomaterials, provide a large surface area for cryosorption.

Growing the nanomaterials directly on a metallic substrate using the wet chemistry, CVD or other suitable processes of the present invention eliminates the need for adhesive and therefore eliminates the limitation on bake temperatures imposed by conventional charcoal or carbon cryosorber materials.

Alternately, some nano-materials are freestanding and self-supporting, such as BNNT Fibril™, which is available from BNNT, LLC, of Newport News, Va. This nanomaterial forms a freestanding self-supporting material with large surface area and good thermal conductivity making it a suitable nanomaterial for testing as a cryosorption material where it could be mechanically attached to the cryopanel also eliminating the need for adhesives and allowing full bakeout of the cryopump system.

With reference to FIG. 1 there is shown a cryopump 10 with adhesive-free nano-materials on the inner cryopanels, either directly grown on the surface or mechanically attached, according to the present invention. The cryopump 10 includes a first stage 20, a second stage 30, and a removable coldhead 40. The cryopump 10 includes a plurality of inner cryopanels 50 and each of the cryopanels includes a layer of nanomaterials 60 that is either grown directly on the cryopanels 50, or mechanically attached to the cryopanels 50. The use of nano-materials grown on or mechanically attached to the cryopanels 50 eliminate the need for adhesives from the system, thereby enabling a full bake of the system to reduce the hydrogen outgassing load, eliminate water vapor from the cryopump, and have the potential to be an extreme high vacuum pump. The meaning of the term "fully baked" as used herein refers to the ability to heat the pump to a temperature above 100° C. Both the free standing, mechanically attached nano-materials or the nano-materials grown directly onto the cryosorption panel of the present invention enable a full bake which reduces hydrogen outgassing from the steel, eliminates water vapor from the system and avoids adhesives with their organic molecule residues.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of pumping a vacuum system to an extreme high vacuum (XHV), comprising:
    a) providing a closed cycle helium refrigeration cryopump with a removable coldhead and a cryosorption panel therein;
    b) securing an adhesive-free nano-material to said cryosorption panel to form a cryosorption surface within said cryopump;
    c) fully baking the cryosorption panel at a temperature greater than 100° C. to reduce the hydrogen outgassing load and eliminate water vapor from the cryopump; and
    d) operating the cryopump until a pressure below $10^{-12}$ Torr is achieved in the vacuum system.

2. The method of claim 1 wherein securing said adhesive-free nano-material to said cryosorption panel includes mechanically attaching said nano-material to said cryosorption panel.

3. The method of claim 1 wherein securing said adhesive-free nano-material to said cryosorption panel includes growing said nano-material directly on said cryosorption panel.

4. The method of claim 3 wherein the mechanically attached nano-material cryosorption material can be a free standing material such as BNNT Fibril™ or other freestanding nanomaterial.

5. The method of claim 2 wherein the means of growing said nano-material directly on said metallic substrate is selected from the group including but not limited to using wet chemistry and chemical vapor deposition (CVD).

6. A method of pumping a vacuum system to an extreme high vacuum (XHV), comprising:
    a) providing a cryopumping panel including a cryosorption surface that can be baked;
    b) securing an adhesive-free nano-material to said cryosorption panel;
    c) fully baking the cryosorption panel at a temperature greater than 100° C. to reduce the hydrogen outgassing load and eliminate water vapor from the cryopump;
    d) cooling said cryosorption panel with liquid helium; and
    e) operating the cryopump until a pressure below $10^{-12}$ Torr is achieved in the vacuum system.

7. The method of claim 6 wherein said cooling includes cooling with a bath of liquid helium.

8. The method of claim 6 wherein said cooling includes cooling with a flow of liquid helium.

* * * * *